March 14, 1950     S. A. HASTINGS     2,500,898
ROLL NECK SEAL

Filed Dec. 22, 1945

INVENTOR.
Shirrel A. Hastings
BY Charles P. Vrjtech
Atty.

Patented Mar. 14, 1950

2,500,898

UNITED STATES PATENT OFFICE 2,500,898

ROLL NECK SEAL

Shirrel A. Hastings, Chicago, Ill., assignor to Crane Packing Company, Chicago, Ill., a corporation of Illinois Application December 22, 1945, Serial No. 636,825

4 Claims. (Cl. 286—11)

This invention relates to fluid sealing devices of the type which effect a seal between two relatively rotatable structures by means having radially disposed contacting surfaces. For purposes of illustration, the invention will be described with reference to its application to a roll neck but it is understood that it may be applied with equal facility to other installations.

The principal object of this invention is to provide a fluid seal for relatively rotatable structures such as a roll neck and the mill chock supporting the roll wherein the seal will be removable with the chock bearing to be sealed and without requiring a separation of the sealing surfaces.

Another object of this invention is to provide a self-contained fluid seal for roll necks or the like having an axially movable sealing washer which is required to be accurately spaced relative to the retainer in which it is supported and wherein means are provided for obtaining this accurate adjustment readily and simply.

Yet another object of this invention is to provide a method of adjusting the position of the seal upon a rotatable structure with reference to the non-rotatable structure.

Figure 1:
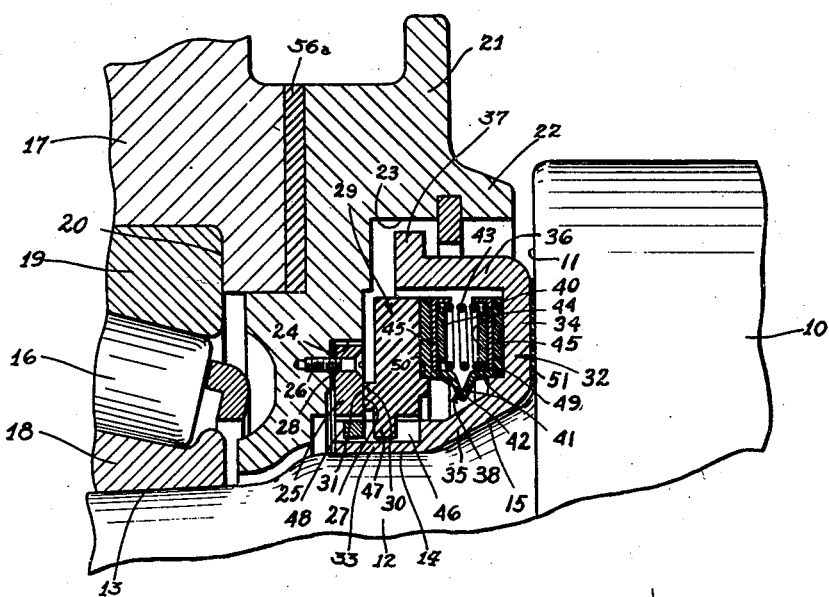
Figure 2:
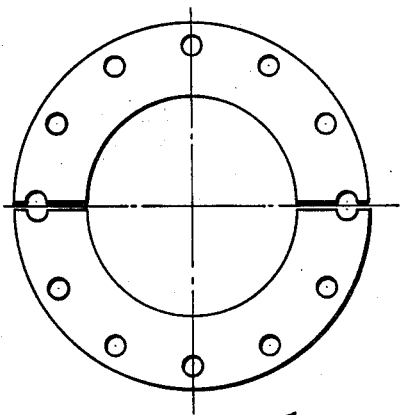
Figure 3:
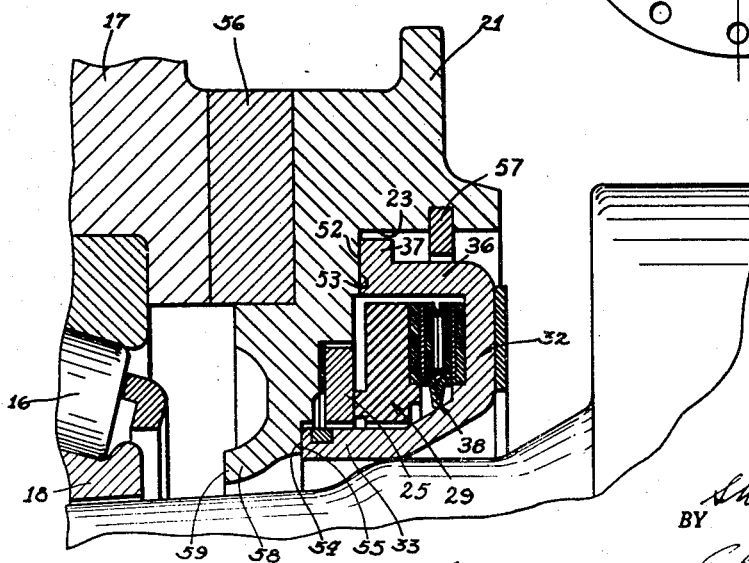

These and other objects and features of this invention will become apparent from the following detailed description when taken together with the accompanying drawings, in which Fig. 1 is a fragmentary elevation, partly in section, of a roll neck, a chock, a bearing for supporting the roll neck from the mill frame and a seal embodying the features of this invention;

Fig. 2 is an illustration on a reduced scale of a split gasket to be used in adjusting the position of the seal of Fig. 1; and Fig. 3 shows the seal of Fig. 1 as it is being pressed upon the roll neck.

Referring now to Fig. 1 for a detailed description of the invention, there is shown a roll 10 having formed at one end a shoulder 11 which terminates in a neck 12. Said neck is provided with a tapered section 13, a substantially cylindrical section 14 and a tapered section 15 joining shoulder 11. A tapered roller bearing 16 supports the neck 12 from a removable chock 17 and is provided with a tapered inner race 18 which is fitted over the tapered section 13 of the roll neck. The outer race 19 of bearing 16 is held in a recess 20 in the chock.

The open space between the outer and inner races of the bearing 16 is partly closed by a closure plate 21 which has a flange 22 extending to the right as viewed in Fig. 1 into proximity to shoulder 11 on roll 10. Closure plate 21 is secured to chock 17 by means of bolts (not shown) so that the plate is constrained to move with the chock. A recess 23 is formed in the right-hand end (Fig. 1) of closure plate 21 and a secondary recess 24 is formed in the inner wall of the first-mentioned recess 23. In the secondary recess 24 is located a hardened and ground ring 25 which is secured by machine screws 26 to the closure plate 21. The radial surface 27 of ring 25 is suitably finished by lapping or otherwise to constitute one of the sealing surfaces of the seal hereinafter to be described. A gasket 28 is interposed between ring 25 and closure plate 21 to effect a fluid-tight seal between the ring and closure plate.

The remainder of the seal is comprised of a washer 29 which is formed with a nose 30 extending to the left as viewed in Fig. 1 in the direction of sealing ring 25. The radially disposed surface 31 on nose 30 is suitably finished by grinding or lapping, and, when in contact with surface 27 on ring 25, forms a fluid-tight seal therebetween such that when there is relative rotation between the washer and ring while contact is maintained between surfaces 27 and 31, there will be no leakage of fluid past these surfaces.

Ring 29 is disposed in a retainer 32, the retainer having an inner cylindrical section 33, a radial section 34 connected to a cylindrical section 33 by a conical section 35 and an outer cylindrical section 36 terminating in a flange 37. Inner cylindrical portion 33 has an inner diameter of such size that a fluid-tight press-fit will be formed between this portion of the retainer and cylindrical section 14 of the roll neck. Thus, when retainer 34 is pressed upon the roll neck to the position shown, said retainer will be constrained to rotate with the roll neck due to the frictional forces developed by the press-fit. It is contemplated that these frictional forces will be greater at all times than the frictional forces developed between the seal faces 27 and 31.

A fluid-tight seal is effected between washer 29 and retainer 32 by means of an annular flexible deformable bellows member 38, said member being made of rubber, either natural or synthetic, or some suitable material which is impervious to fluids and which will not be adversely affected by the fluids and temperatures encountered in a roll neck. Said bellows member is formed with spaced flanges 39 and 40, flange 39 contacting the back of washer 29 and flange 40 contacting the vertical section 34 of retainer 32. Flanges 39 and 40 are joined to cylindrical sections 41 which in turn are connected to a V-shaped bellows 42 so that the flanges may move axially relative to one another without unduly distorting the bellows member 38. The flanges are urged apart by a plurality of helical springs 43 spaced equidistantly about the flanges and held in place by disc-like protuberances 44 formed in washers 45. The washers assist in distributing the spring pressure evenly about the flanges.

All driving torque is removed from the bellows 38 by a slidable driving connection between the washer 29 and retainer 32. This driving connection is comprised of slots 46 formed in the inner cylindrical portion 33 of retainer 32 and receiving within them radially inwardly projecting lugs 47 formed in washer 29. A snap ring 48 locks lugs 47 in slots 46 and prevents the spring pressure from moving washer 29 completely out of retainer 32. Thus, when the retainer and its associated parts are being handled, the washer will be held in the retainer with the lugs 47 properly indexed relative to slots 46 and thereby making it unnecessary to exert any special care in handling the washer and retainer.

It will be observed that retainer 32 is provided with a shoulder 49 for properly centering flange 40 of the bellows with respect to the retainer and similarly, washer 29 is provided with a shoulder 50 for properly centering flange 29 relative to the washer. When properly centered as shown and with the spring pressure tending to separate the flanges 39 and 40, a fluid-tight seal will be effected between the washer and bellows member and between the bellows member and the retainer.

To insure a fluid-tight seal between the retainer 32 and the roll, a gasket 51 is inserted between the shoulder 11 on roll 10 and the vertical portion 34 of retainer 32. This gasket 51 is preferably glued to the said vertical portion 34. It will be noted, however, that the conical section 35 of the retainer is not in contact with the corresponding conical section 15 of the roll neck so that binding between these two elements at this point is eliminated.

Referring now to Fig. 3, it will be observed that retainer 32 is pressed upon roll neck 12 by establishing contact between the inner and outer cylindrical sections 33 and 36 of the retainer and the closure plate 21. Thus the left-hand radial surface 52 of flange 37 contacts the inner wall 53 of the recess 23 in closure plate 21 and the end surface 54 of inner cylindrical portion 33 contacts the bottom of a recess 55 formed on the inner region of closure plate 21. It will be noted in Fig. 3 that the sealing ring 25 has pushed washer 29 back into retainer 32 to approximately the limit of its movement in this direction. Obviously when the retainer and washer are in their operating positions the ring must be moved back to the left as viewed in Fig. 3 to the position shown in Fig. 1. It is thus necessary to move the closure plate 21 back from retainer 32 after it has served to push retainer 32 on the roll neck to its proper position. To this end a split gasket 56 is inserted temporarily between closure plate 21 and chock 17, the gasket being of such width that the retainer will be firmly in place upon the roll neck before the inner race 18 of the bearing 16 will be in its place on the roll neck. It is contemplated of course that the chock 17 will be moved toward roll 19 to effect the proper movement of closure plate 21 and retainer 32 in this direction.

After retainer 32 is in substantially the position shown in Fig. 1, gasket 56 is removed, chock 17 is moved to its proper position such that inner race 18 is firmly supporting roll neck 12 and closure plate 21 is then moved towards chock 17 until the spacing between shoulder 11 of the roll and the end of flange 22 is approximately that shown in Fig. 1. This insures a proper positioning of washer 29 relative to retainer 32 and also insures that there will be no physical contact between closure plate 21 and the retainer 32 at any point. The proper spacing being selected, a thinner gasket is then inserted between closure plate 21 and chock 17, the thinner gasket being shown at 56a in Fig. 1 and the closure plate is tightened upon the chock. The seal is then ready for use.

When it is desired to dress a roll, the chock 17 is moved to the left as viewed in Figs. 1 and 3 and it is desirable of course under these conditions to remove retainer 32 as well as ring 25. For this purpose a snap ring 57 is used in closure plate 21. The snap ring has an inner diameter which is greater than the outside diameter of cylindrical portion 36 of retainer 32 but which is smaller than the external diameter of flange 37. Thus when chock 17 is moved to the left the snap ring 57 will strike the back of flange 37 and will cause the flange and associated retainer 32 to be removed from the roll neck 12 along with the closure plate 21. To assist in removing inner race 18 from the roll neck likewise, a flange 58 is provided on the inside of closure plate 21, said flange having a surface 59 which is adapted to strike the side of inner race 18 when the gasket 56a is removed and cause said inner race to be moved with the chock. In the normal operation of the fluid seal, a spacing such as that shown in Fig. 1 is provided between surface 59 and inner race 18 to avoid any interference between the flange and inner race.

When it is desired to remove retainer 32 from closure plate 21, snap ring 57 is collapsed radially inwardly until it is free of the groove in which it is normally located and is then withdrawn from the closure plate. This permits retainer 32 to be removed from the closure plate and the seal members therein to be inspected, cleaned or replaced. This also permits inspection of sealing ring 25 and, if necessary, its replacement with another ring.

Although it is customary with the types of fluid seals now used in roll necks to replace the entire seal when the roll is removed and dressed, this expense is saved in the present type of seal since the surfaces which do the sealing are of such quality that they will withstand several times the amount of wear that the ordinary seal would withstand. Thus, the sealing ring 25 is made of hardened steel and the sealing washer 29 is made of a thermosetting composition with or without metallic particles added to increase the wearing qualities and decrease the friction. Should the sealing surfaces become so worn that they are no longer fluid-tight, both the sealing ring 25 and the washer 29 may be replaced without the necessity of replacing the remainder of the seal. These two sealing elements will be less expensive than an entire new seal of the type ordinarily used.

In place of using the chock to press the plate 21 and retainer 32 upon the roll neck, the closure plate 21 may be used alone with some external means for supplying the necessary pressure. After the closure plate 21 has served its purpose, the chock may be placed in its proper position and a gasket of appropriate thickness may be inserted between the two as before.

It is understood that the foregoing description is illustrative of a preferred embodiment of this invention and that the scope of the invention is not to be limited thereto, but is to be determined by the appended claims.

What is claimed is:

1. A rotary sealing device for effecting a seal between a rotary structure and a housing through which the structure passes, the device having a sealing washer, a seal seat on the housing against which the sealing washer bears, a retainer for the washer, a flexible element for effecting a seal between the washer and retainer, and a rotary driving axially slidable connection between the washer and retainer, said device being characterized by a press-fit between the rotary structure and the retainer, a recessed plate on the housing, the retainer fitting in the recess in the plate and being adapted to be contacted by the bottom of the recess to be pressed on the rotary structure by pressure through the plate, a removable abutment on the plate projecting into the recess, and a radially outwardly extending abutment on the retainer located between the bottom of the recess and the removable abutment to facilitate the removal of the retainer from the rotary structure.

2. A rotary sealing device as described in claim 1, the said rotary structure having a reduced diameter portion forming a shoulder with the remainder of the structure, said retainer being pressed upon the neck portion so as to be rotatable therewith, and packing between the retainer and shoulder.

3. A rotary sealing device as described in claim 1, the plate extending radially across the entire retainer and being adapted to contact the inner portion of the retainer to assist in pressing the retainer upon the rotary structure.

4. A rotary sealing device as described in claim 1, said retainer being substantially U-shaped, the seat being positioned in the open end of the U and the plate having abutments aligned with the ends of the U.

SHIRREL A. HASTINGS.

REFERENCES CITED

The following references are of record in the file of this patent:

UNITED STATES PATENTS

| Number | Name | Date |
| --- | --- | --- |
| 2,249,930 | Bailey et al. | July 22, 1941 |
| 2,288,164 | Ketcher | June 30, 1942 |
| 2,322,834 | Dornhofer | June 29, 1943 |
| 2,403,298 | Payne | July 2, 1946 |